(12) United States Patent
Helmbrecht

(10) Patent No.: US 6,583,784 B1
(45) Date of Patent: Jun. 24, 2003

(54) POINTING DEVICE BASED UPON THE HALL EFFECT AND METHOD FOR OPERATING THE SAME

(75) Inventor: Robert Edward Helmbrecht, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/474,716

(22) Filed: Dec. 29, 1999

(51) Int. Cl.[7] .................................................. G09G 5/08
(52) U.S. Cl. ...................... 345/167; 345/157; 345/164
(58) Field of Search ................................. 345/163, 164, 345/167, 157, 158, 156, 184; 324/207.13

(56) References Cited

U.S. PATENT DOCUMENTS 5,168,221 A  * 12/1992 Houston ................ 324/207.13
5,237,311 A  * 8/1993 Mailey et al. ............... 345/167
5,583,541 A  * 12/1996 Solhjell ....................... 345/167
5,831,553 A  * 11/1998 Lenssen et al. ............. 345/167

* cited by examiner

*Primary Examiner*—Kent Chang
*Assistant Examiner*—David L. Lewis

(57) ABSTRACT

In various embodiments of the invention, an improved track ball suitably includes one or more field-producing elements that produce or respond to electromagnetic fields in accordance with the Hall Effect. Hall Effect sensors in proximity to the track ball sense changes in the electromagnetic field or in the Hall Effect, and produce corresponding output signals. The output signals may be used, for example, as a control input to a digital computer for such applications as games, simulations, or control applications such as controls for an aircraft or other vehicle.

20 Claims, 3 Drawing Sheets

POINTING DEVICE BASED UPON THE HALL EFFECT AND METHOD FOR OPERATING THE SAME

FIELD OF THE INVENTION

The invention relates to devices and techniques for positioning a pointer such as a cursor on a computer display. More specifically, the invention relates to a pointing device such as a track ball that is based upon the Hall Effect.

BACKGROUND OF THE INVENTION

Numerous pointing devices such as joysticks, mice, track balls, touch pads and the like are well known in the art. Such pointing devices are frequently used to position a cursor or other pointer on an electromagnetic display such as a flat panel display, cathode ray tube (CRT) display, liquid crystal display (LCD), plasma display, or the like. Pointing devices are useful in various computing applications such as games, simulations, control applications, or any other computer application. Track balls are particularly convenient for use as an input device for games, simulations, and control applications because track balls allow precise positioning of pointers, cursors or other objects on a computer display.

Various types of track balls have been used in the prior art. For example, mechanical track balls available from, for example, Pennie and Giles, CTI, and other manufacturers include gear-like mechanisms and switches that allow users to position objects on a display by rotating or otherwise manipulating a mechanical ball. The track ball device senses movement of the ball, and provides a corresponding control signal to the computerized display. Mechanical track balls typically exhibit a noted disadvantage, however, in that the switches and gear-like apparatus can fail or wear over time. Hence the reliability of such devices is suspect, particularly in environments that may be subject to large amounts of dust or other contaminants.

Optical track balls such as those available from the Logitech Corporation of Fremont, Calif. are less susceptible to dust and other contaminants, but such devices include optical guides that may wear or otherwise degrade over time. Moreover, optical track balls may be susceptible to radio frequency (RF) interference or other forms of interference. Hence even optical track balls are not suitable for all situations.

It is therefore desired to create a pointing device using a new sensor technology that is not susceptible to the disadvantages of prior art pointing devices.

SUMMARY OF THE INVENTION

In various embodiments of the invention, an improved track ball suitably includes one or more field-producing elements that produce or respond to electro-magnetic fields in accordance with the Hall Effect. Hall Effect sensors in proximity to the track ball sense changes in the electromagnetic field or in the Hall Effect, and produce corresponding output signals. The output signals may be used, for example, as a control input to a digital computer for such applications as games, simulations, or control applications such as controls for an aircraft or other vehicle.

BRIEF DESCRIPTION OF THE DRAWING FIGURES

The above and other features and advantages of the present invention are hereinafter described in the following detailed description of illustrative embodiments to be read in conjunction with the accompanying drawing figures, wherein like reference numerals are used to identify the same or similar parts in the similar views and:

DETAILED DESCRIPTION OF EXEMPLARY EMBODIMENTS

Figure 1:
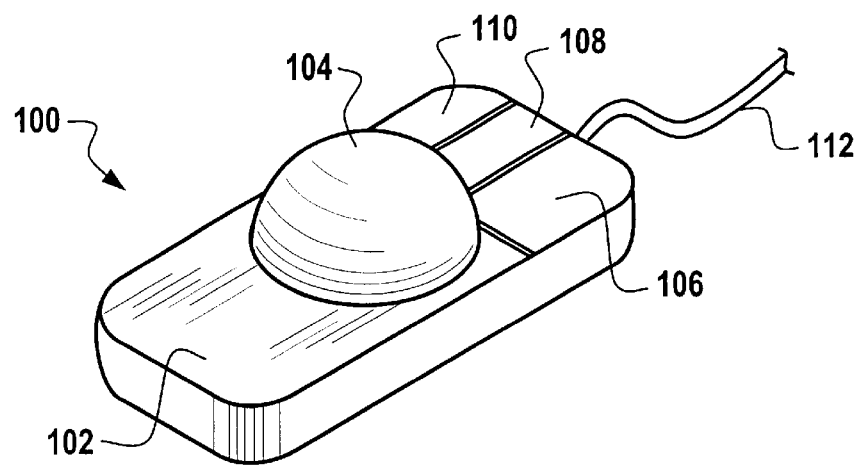
FIG. 1 is a perspective view of an exemplary track ball assembly.

The present invention may be described herein in terms of functional block components and various processing steps. It should be appreciated that such functional blocks may be realized by any number of hardware and/or software components configured to perform the specified functions. For example, the present invention may employ various discreet or integrated circuit components, e.g., memory elements, processing elements, logic elements, look-up tables, and the like, that may carry out a variety of functions under the control of one or more microprocessors or other controlled devices. Similarly, the software elements of the present invention may be implemented with any programming or scripting language such as C, C++, Java, assembly language, machine language, or the like, with the various algorithms being implemented in any combination of data structures, objects, processes, routines or other programming elements. Further, it should be noted that the present invention may employ any number of conventional techniques for electronics configuration, signaling, data processing, mechanical configuration and the like.

It should be appreciated that the particular implementations shown and described herein are examples of the invention and are not intended to otherwise limit the scope of the present invention in any way. Indeed, for the sake of brevity, conventional electronics, software development and other functional aspects of the systems (and components of the individual operating components of the systems) may not be described in detail herein. Furthermore, the connecting lines shown in the various figures contained herein are intended to represent exemplary functional relationships.and/or physical or logical couplings between the various elements. It should be noted that many alternative or additional functional relationships, physical connections or logical connections may be present in a practical track ball utilizing the Hall Effect.

Generally speaking, when a steady current is flowing in a steady magnetic field, electromotive forces are developed that are at right angles both to the magnetic force and to the current. These electromotive forces are proportional to the product of the intensity of the current, the magnetic force, and the sine of the angle between the directions of these quantities. This phenomenon is known as the Hall Effect. Stated another way, the Hall Effect is a phenomenon that arises when an electric current and magnetic field are simultaneously imposed on a conducting material.

In a broad aspect of the present invention, a trackball is provided that includes a ball having embedded therein or thereon a electro-magnetic field producing element such as a magnet or a number of metallic elements. The field producing element may produce or reflect an electromagnetic field in accordance with the Hall Effect. As the ball rotates, the electro-magnetic field produced by the field-producing elements also rotates as appropriate. That is, the electro-magnetic field observed on the surface of the ball may remain fixed with respect to the ball itself, but the field observed by a relatively stationary sensor next to the ball will vary as the ball rotates. Hence, the rotation of the ball can be sensed by a detector (which may include one or more sensors), and an output signal corresponding to the ball's rotation can be prepared based upon the fields observed by the detector. The output signal may be computed and/or provided by, for example, position processing electronics as described below.

FIG. 1 is a perspective view of an exemplary track ball 100. Track ball 100 suitably includes a ball 104, a housing 102, one or more buttons such as buttons 106, 108 and 110, and a cable 112 providing a signal from track ball 100 to a digital computer (not shown) or other apparatus. To operate track ball 100, a user rotates ball 104 in any direction. The rotation is sensed by sensors (not shown) within housing 102, and the rotation is converted to an output signal provided via cable 112 by electronics located within housing 102. Buttons such as buttons 106, 108 and 110 may be used much like the buttons on a mouse or other planing device, to select objects on a display screen, for example, or for any other purpose. Of course various configurations of track balls could be formulated in accordance with the present invention. For example, housing 102 may be configured in any manner, such as in an ergonomic manner that is tailored to accommodate a human hand, or in any other manner. Similarly, ball 104 may be formulated of plastic, metal, acrylic, or any other material.

Figure 2:
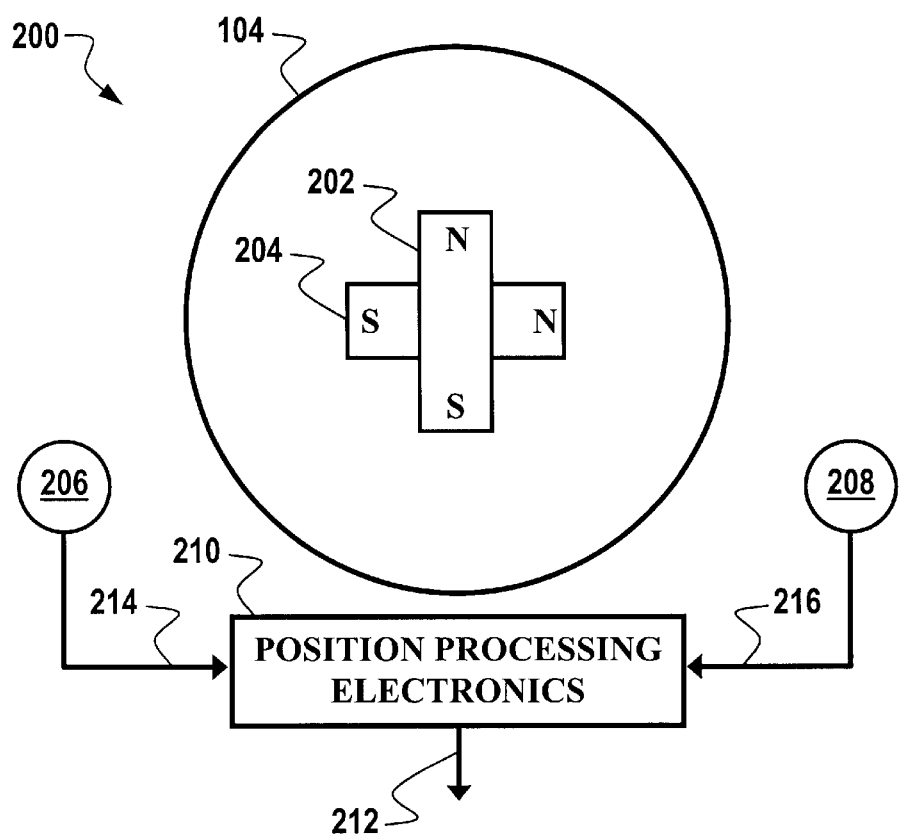
FIG. 2 is a block diagram of an exemplary first embodiment of a track ball utilizing the Hall Effect.

FIG. 2 is a block diagram of an exemplary track ball 200 that operates in accordance with the Hall Effect. With reference now to FIG. 2, track ball 200 suitably includes ball 104 as described above, but with the addition of one or more magnets such as magnets 202 and 204. Magnets 202 and 204 produce electro-electro-magnetic fields that are detectable by sensors 206 and 208, respectively. Sensors 206 and 208 are any type of Hall Effect sensor such as, for example, the MRL Hall Effect sensor available from Honeywell International Inc. of Freeport, Ill. Other exemplary Hall Effect sensors include the Model LA25-NP sensor available from the LEM Corporation of Milwaukee, Wis. Alternatively, any type of Hall Effect or other electromagnetic sensor could be used to implement sensors 206 and 208. In various embodiments, sensors 206 and 208 provide electrical signals 214 and 216, respectively, to position processing electronics 210. Signals 214 and 216 may be any form of electrical or optical output signal, such as a voltage or current. In an exemplary embodiment, signals 214 and 216 are voltages that are proportional to the magnitude of the Hall effect observed by the relevant sensor. Alternatively, signals 214 and 216 could be digital representations of the Hall effect observed by sensors 206 and 208, respectively.

Position processing electronics 210 suitably include any hardware or software equipment for receiving.signals 214 and 216 from sensors 206 and 208, respectively, at a producing and output signal 212 that is indicative of the rotation of ball 104. In various embodiments, position processing electronics 210 suitably include a microprocessor or microcontroller such as any of the microcontroller products available from, for example, the Motorola Corporation of Schaumburg, Ill., the Intel Corporation of Santa Clara, Calif., or the Microchip Corporation of Chandler, Ariz. Alternatively, a digital signal processor (DSP) could be used with position processing electronics 210. Exemplary digital signal processors include those available from, for example, the Texas Instruments Corporation of Piano, Tex., or the Lucent Corporation of Murray Hill, N.J. The various microcontrollers, microprocessors, or DSP chips may communicate with one or more digital memories (not shown) to process signals 214 and 216. An exemplary technique for processing such signals is disclosed below in conjunction with FIG. 4.

To operate track ball 200, a user rotates ball 104 such that the electro-magnetic fields produced by magnets 202 and 204 are rotated. Note that a third magnet (not shown) could be added to ball 104 to detect movements in a third dimension, if required, or to improve resolution in two dimensions. Such a magnet may be perpendicular to magnets 202 and 204, or may be otherwise oriented as appropriate for the particular embodiment. As the electro-magnetic fields generated by magnets 202 and 204 rotate in conjunction with rotation of ball 104, the electro-magnetic fields detected by Hall Effect sensors 206 and 208 correspondingly vary. As such, the output signals 214 and 216 produced by sensors 206 and 208, respectively, may vary in accordance with the electromagnetic field detected at the relevant sensor. In other embodiments, magnets 202 and 204 are arranged such that the magnets produce a unique electromagnetic field at each portion on the outer surface of ball 104. In such embodiments, a single sensor 206 may be used to detect the portion of ball 104 in closest proximity to the sensor 206, such that the exact position of ball 104 can be known. That is, the intensity of the electro-magnetic field associated with ball 104 and sensed at a particular position by sensor 206 is indicative of the orientation of ball 104. Position processing electronics 210 may suitably provide an output signal 212 that corresponds to the position of ball 104.

Figure 3:
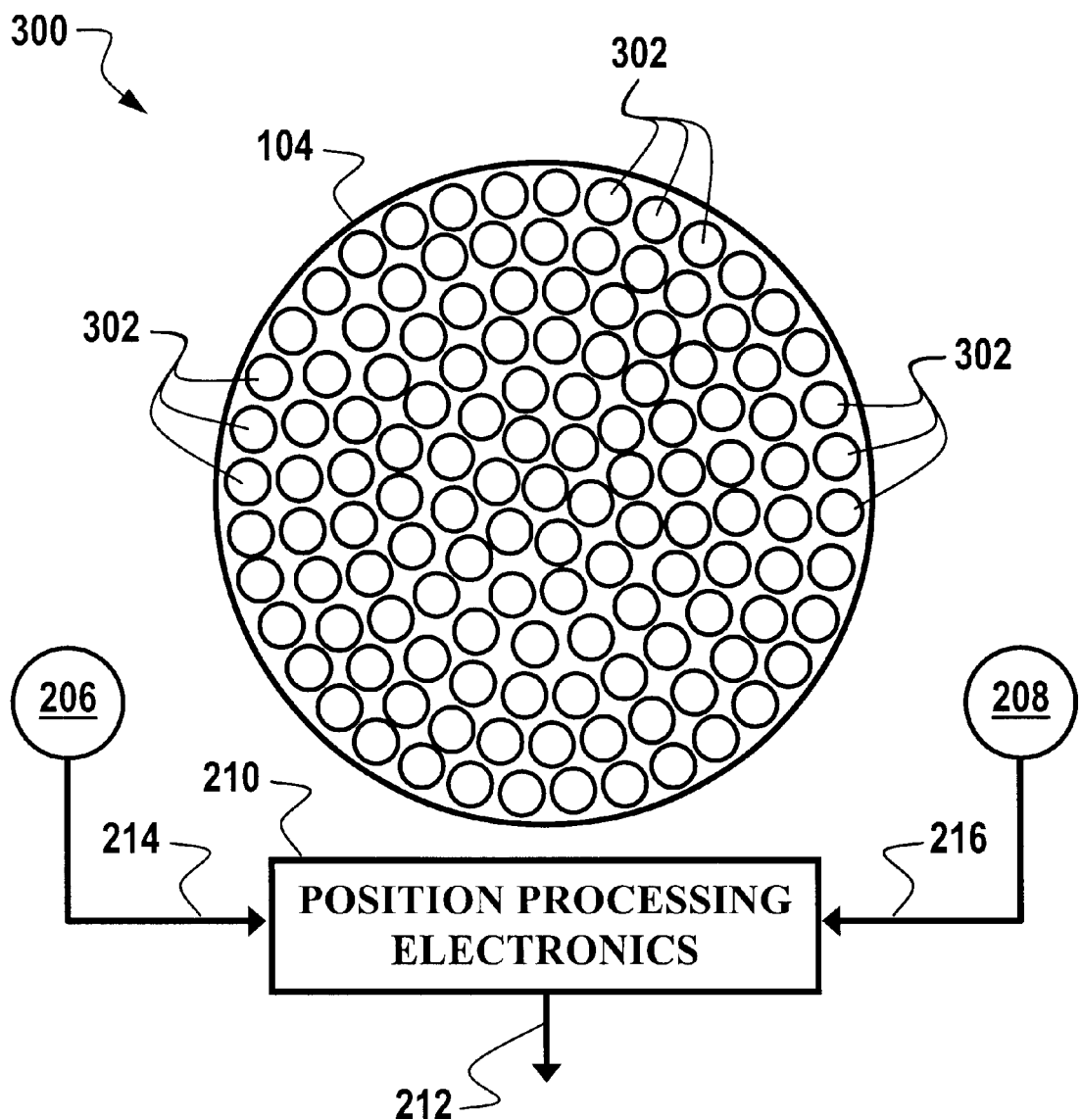
FIG. 3 is a block diagram of a second exemplary embodiment of a track ball utilizing the Hall Effect.

FIG. 3 is a block diagram authentic exemplary track ball 300 using a different technique for Hall Effect sensing. Ball 104 suitably includes a number of conducting elements 302. Elements 302 may be comprised of any conducting material, such as a ferrous or non-ferrous metal or any combination of materials. In various embodiments, elements 302 are manufactured to include MU metal, which is highly responsive to electro-magnetic fields. Elements 302 may be distributed through ball 104 in any manner. For example, elements 302 may be distributed along the surface of ball 104, or they may be distributed throughout the entirety of ball 104. Similarly, elements 302 may be arranged in any pattern, such as a regular interspersed pattern, or a randomly placed pattern. In an exemplary embodiment, however, elements 302 are interspaced upon the surface of ball 104 in a regular pattern such that each element 302 is approximately equidistant from the other elements 302. Hall Effect sensors 206 and 208 suitably induce electro-magnetic fields upon elements 302, such that the passage of an element 302 in close proximity with a sensor 206 or 208 can be detected. Sensors 206 and 208 suitably provide outputs 214 and 216, as described above, to position processing electronics 210 to indicate the passage of an element 302 in proximity with the relevant sensor 206 or 208. Of course, various embodiments of the invention may use any number of Hall Effect sensors. For example, a simple embodiment may include a single Hall Effect sensor that is capable of detecting element movement in various directions. Similarly, additional sensors could be provided to increase resolution, or to increase sensitivity in multiple dimensions.

Figure 4:
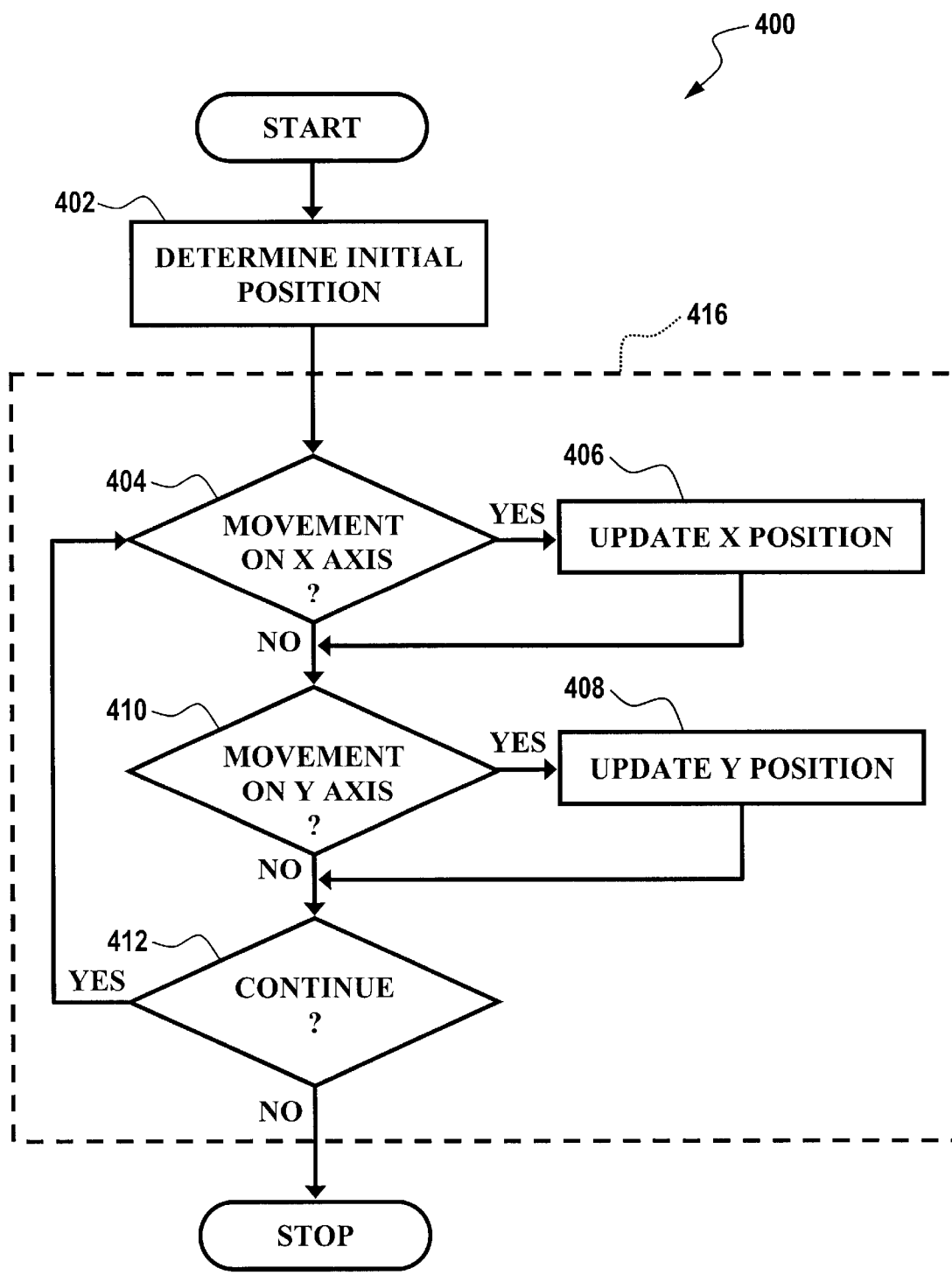
FIG. 4 is a flow chart of an exemplary process for monitoring movement of a track ball based upon the Hall Effect.

FIG. 4 is a flow chart of an exemplary technique 400 suitable for producing output signal 212 at position processing electronics 210. Technique 400 suitably includes determining in initial position (step 402) of ball 104 through any technique. For example, an initial position may be determined at power up by sensing the magnitude of the electro-magnetic field at a given point (such as at a sensor 206 or 208). Alternatively, an absolute position may not be necessary in embodiments requiring only relative rotation of ball 104 as an output. In such embodiments, an initial configuration may be stored in memory such that deviations from this position can be monitored and provided as output 212. For example, a two (or more) coordinate "starting point" may be recorded in memory, or the initial position of ball 104 could be recognized as "home" (e.g. point 0,0 on a two-coordinate axis system).

After the initial position is determined, an interactive process 416 involves monitoring movements at each sensor 206 and 208. Although FIG. 4 shows process 416 as being executed in a "IF-THEN" configuration, any looping or iteration scheme.could be used. For example, a practical process 416 may be implemented with a "WHILE-DO" process, a polled process, or an interrupt driven process. In the various embodiments, movement of ball 104 is tracked on various axes (steps 404 and 410). This movement is detected, the position of the ball is updated along the relevant axis (steps 406 and 408). Of course, the position may be updated in any manner, for example by updating a value stored in memory, or by providing an electrical indication to an external computer via cable 112 (FIG. 1). Moreover, movement could be tracked in three or more dimensions by simply adding additional decision blocks such as 404 and 410. Movement upon a relevant axis may be sensed by any technique, but in various embodiments movement upon an individual axis is sensed at an individual sensor, such as sensor 206 or sensor 208. For example, and with momentary reference to FIG. 2, rotation of ball 104 will create a shift in the electromagnetic field produced by magnet 202, which may be sensed by sensor 206. Similarly, rotation of ball 104 in a second direction will cause changes in the electro-magnetic field produced by magnet 204. These changes may be sensed by sensor 208. Additional sensors could detect lateral displacement of ball 104 or rotation of ball 104 in a third direction (e.g., about the axis normal to magnets 202 and 204 in FIG. 2). With momentary reference to FIG. 3, rotation of ball 104 may produce changes in the Hall Effect from elements 302 observed at sensors 206 and 204 dependent upon the direction of rotation. Corresponding output signals 214 and 216 may thusly contain indications of rotation in two directions. Position processing electronics 212 may then produce an output signal 212 that is indicative of the rotational displacement of ball 104 in a first or second direction. Of course output signal 212 may be updated as ball 104 continues to rotate in order to provide a continual position indication via cable 112 to an external digital computer or other device. If signal 212 indicates, for example, an X-Y coordinate corresponding to the rotational position of track ball 104, a cursor or other item on a display screen may be correspondingly manipulated by rotating ball 104.

The corresponding structures, materials, acts and equivalents of all elements in the claims below are intended to include any structure, material, or acts for performing the functions in combination with other claimed elements as specifically claimed. Moreover, the steps recited in any method claims may be executed in any order. The scope of the invention should be determined by the dependent claims and their legal equivalence, rather than by the examples given above.

What is claimed is:

1. A trackball assembly comprising:

a ball having an outer surface and a Hall Effect producing element comprising at least two magnets, the at least two magnets being disposed within the ball and producing a magnetic field about the ball such that the intensity of the magnetic field is unique for each portion of the outer surface of the ball;

a detector configured to detect the electro-magnetic field generated by the Hall Effect producing element upon a portion of the outer surface proximate to the detector; and position processing electronics configured to correlate the field with a position of the ball and to provide an output signal, wherein the output signal is a function of the rotation of the ball as sensed by the detector.

2. The trackball assembly of claim 1 wherein said Hall Effect producing element comprises a first magnet producing a first electro-magnetic field.

3. The trackball assembly of claim 2 wherein said Hall Effect producing element comprises a second magnet producing a second electro-magnetic field.

4. The trackball assembly of claim 3 wherein said Hall Effect producing element comprises a third magnet producing a third electro-magnetic field.

5. The trackball assembly of claim 3 wherein said first electro-magnetic field is orthogonal to said second electro-magnetic field.

6. The trackball assembly of claim 1 wherein said Hall Effect producing element comprises a plurality of conducting elements.

7. The trackball assembly of claim 6 wherein each of said conducting elements provide radiation to said detector in accordance with the Hall Effect.

8. The trackball assembly of claim 3, wherein said detector includes a first sensor responsive to said first magnet and a second sensor responsive to said second magnet.

9. The trackball assembly of claim 7 wherein said detector includes first and second sensors detecting movement of said ball in first and second directions, respectively.

10. A method of detecting movement, the method comprising the steps of:

providing a trackball having an electromagnetic field about said trackball generated from inside the trackball such that the intensity of the magnetic field is unique for each portion of the outer surface of said trackball;

sensing said electro-magnetic field produced at a portion of the outer surface proximate a detector; and providing an output signal from the detector based upon the electro-magnetic field such that said output signal provides an indication of the position of the ball with respect to the detector.

11. A method of claim 10 wherein said electro-magnetic field is produced by a first magnet and a second magnet.

12. A method of claim 11 wherein said sensing step comprises sensing movement in a first direction corresponding to said first magnet and in a second direction corresponding to said second magnet.

13. A method of claim 12 wherein said output signal is a function of movement in said first direction and in said second direction.

14. A method of claim 10 wherein said electro-magnetic field producing means comprises a plurality of conducting elements.

15. The method of claim 14 wherein said metal elements comprise MU metal.

16. The method of claim 14 wherein said sensing step comprises tracking movements of said plurality of conducting elements from an initial position.

17. A method of sensing rotation of a rotating element, the method comprising the steps of;

generating an electro-magnetic field from within said rotating element, wherein the intensity of each portion of said electromagnetic field is uniquely correlated with a portion of the outer surface of said rotating element;

detecting the intensity of the electro-magnetic field at a detector positioned proximate to the outer surface of said rotating element to produce a detector output; and processing said detector output to determine an orientation of said rotating element with respect to the detector as a function of the intensity of the electro-magnetic field.

18. The method of claim 17 further comprising the step of correlating said orientation of said rotating element to a rotation of said rotating element.

19. The method of claim 17 wherein said electromagnetic field is generated by at least two magnets.

20. The method of claim 19 wherein said at least two magnets are arranged substantially orthogonally to each other.

* * * * *